United States Patent
Sterbenz et al.

(10) Patent No.: US 12,168,389 B2
(45) Date of Patent: Dec. 17, 2024

(54) AUTOMATIC VENTILATION SYSTEM AND METHOD FOR PURGING AN INTERIOR SPACE OF A VEHICLE DURING SHIPPING

(71) Applicant: Ford Global Technologies, LLC, Dearborn, MI (US)

(72) Inventors: Scott Christopher Sterbenz, Brownstown, MI (US); Eric Jay MacLean, Brighton, MI (US); Daniel Ferretti, Commerce Township, MI (US); Timothy James Hallifax, Toorak (AU); Gary D. Mullen, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 488 days.

(21) Appl. No.: 17/717,219

(22) Filed: Apr. 11, 2022

(65) Prior Publication Data

US 2023/0322046 A1    Oct. 12, 2023

(51) Int. Cl.
*B60H 1/24* (2006.01)
*B60H 1/00* (2006.01)

(52) U.S. Cl.
CPC ......... *B60H 1/249* (2013.01); *B60H 1/00842* (2013.01)

(58) Field of Classification Search
CPC ..... B60H 1/248; B60H 1/249; B60H 1/00778
See application file for complete search history.

(56) References Cited

U.S. PATENT DOCUMENTS

| | | | | |
|---|---|---|---|---|
| 9,889,723 | B2* | 2/2018 | Marleau, Jr. | B60H 1/249 |
| 10,279,658 | B2* | 5/2019 | Zhang | B60H 3/06 |
| 10,556,488 | B2* | 2/2020 | Sawyer | B60H 3/0085 |
| 2010/0140070 | A1* | 6/2010 | Simard | G04G 15/006 200/33 R |
| 2013/0072101 | A1* | 3/2013 | Marleau, Jr. | B60H 1/248 454/162 |
| 2013/0180264 | A1* | 7/2013 | Daniels | F04B 39/00 62/323.3 |
| 2016/0214459 | A1* | 7/2016 | Sawyer | B60H 3/0085 |
| 2018/0251947 | A1* | 9/2018 | Stone | B01F 35/221 |
| 2018/0310542 | A1* | 11/2018 | Pearce | A01M 1/02 |
| 2019/0047449 | A1* | 2/2019 | Fujii | B60N 2/5657 |
| 2020/0263801 | A1* | 8/2020 | Sterbenz | F16K 1/2021 |

FOREIGN PATENT DOCUMENTS

GB            516448 A        1/1940

* cited by examiner

*Primary Examiner* — Ko-Wei Lin
(74) *Attorney, Agent, or Firm* — Vichit Chea; Price Heneveld LLP

(57) ABSTRACT

A ventilation system and method of purging volatile organic compounds from an interior space of the vehicle. The ventilation space including an air extractor connected to a vehicle wall and having an interior side within the interior space defined by the vehicle wall, a fan attached to the interior side, and a controller configured to operate in a shipping mode to activate the fan to generate ventilation flow through the air extractor.

18 Claims, 8 Drawing Sheets

AUTOMATIC VENTILATION SYSTEM AND METHOD FOR PURGING AN INTERIOR SPACE OF A VEHICLE DURING SHIPPING

FIELD OF THE DISCLOSURE

The present disclosure generally relates to an automatic ventilation system and method for purging an interior space of a vehicle during shipping of the vehicle, and in particular, purging volatile organic compounds that may be emitted by components in a motor vehicle interior space during shipping.

BACKGROUND OF THE DISCLOSURE

Several components of newly manufactured vehicles may emit volatile organic compounds (VOCs) after the vehicle is manufactured, particularly within the initial 120 days. During vehicle shipping, airflow out of the vehicle may be restricted such that the emitted VOCs may not readily escape.

A number of countries have established regulations or guidelines regarding acceptable chemical concentrations in motor vehicles. One exemplary approach taken to reduce new car VOC emission levels during shipping involves temporary installation of solar powered fans within a new vehicle to act as an exhaust mechanism during shipping. Another exemplary approach, which is usually implemented post-delivery, involves automatically sensing when a new vehicle has been stationary for a given period of time and then automatically partially lowering all windows of the vehicle and activating the vehicle's climate control system. However, that approach consumes excessive battery power, and also exposes interiors of the vehicle to external elements.

SUMMARY OF THE DISCLOSURE

In some embodiments of the present disclosure, efficient and effective ventilation for purging VOCs from the interior of a newly manufactured vehicle, during shipment of the vehicle, is achieved through use of an automatic ventilation system that operates on low power within the vehicle.

According to a first aspect of the present disclosure, a ventilation system for purging an interior space of a vehicle is provided. The ventilation system includes an air extractor having an interior side within the interior space of the vehicle and an exterior side, opposite the interior side, exposed to an outside atmosphere. The air extractor including a fluid path extending between the interior space and the atmosphere, and a movable air restriction member within the fluid path. The ventilation system also includes a fan adjacent to the air extractor on the interior side, with an exhaust end portion of the fan being positioned proximate the movable air restriction member to direct a ventilation flow through the fluid path to the atmosphere, and a controller configured to operate in a shipping mode, wherein the controller initiates a plurality of purge cycles over a period of time, with each purge cycle being spaced apart from the next purge cycle by an intercycle period, wherein the fan operates during each of the purge cycles to deliver the ventilation flow and the fan is inactive during each intercycle period.

Embodiments of the first aspect of the disclosure can include any one or a combination of the following features:
the fan is integrally formed with at least a portion of the air extractor;
the fan is removably attached to the air extractor by a releasable retaining member;
each of the plurality of purge cycles runs between 1-4 minutes;
each of the plurality of purge cycles runs for less than 4 minutes;
the intercycle period lasts for between 0.5-2 hours;
the intercycle period lasts for more than 0.5 hours;
the fan supplies less than 300 CFM of ventilation flow during each of the plurality of purge cycles;
the fan supplies less than 50 CFM of ventilation flow during each of the plurality of purge cycles; and
an actuator coupled to a drive assembly for the air extractor, wherein the controller activates the actuator to actuate the drive assembly and displace the movable air restriction member from a closed position to an open position during one or more of the purge cycles.

According to a second aspect of the present disclosure, a ventilation system for purging an interior space of a vehicle. The ventilation system includes an air extractor connected to a vehicle wall and having an interior side within the interior space defined by the vehicle wall, a fan attached to the interior side, and a controller configured to operate in a shipping mode to activate the fan to generate ventilation flow through the air extractor.

Embodiments of the second aspect of the disclosure can include any one or a combination of the following features:
the controller is configured to operate the fan during a plurality of purge cycles, with the purge cycles being spaced apart by intercycle periods;
the controller is configured to continue initiating the purge cycles over a preselected shipping time countdown period unless otherwise interrupted;
the shipping time countdown period is less than 150 days; and
a drive assembly that displaces a moveable air restriction member of the air extractor if operated, and wherein the controller is configured to operate the drive assembly to displace the moveable air restriction member from a closed position to an open position during at least part of the time if the ventilation flow is generated.

According to a third aspect of the present disclosure, a method of purging an interior space of a vehicle is provided. The method includes the steps of positioning a fan proximate an air extractor, the air extractor having a fluid path extending between the interior space of the vehicle and an outside atmosphere, and controlling an operating process for the fan using a controller in a shipping mode. The process including initiating a purge cycle during which power is transmitted to the fan for operating the fan, executing an intercycle period during which power is terminated to the fan, and repeating the initiating and executing a plurality of times during a countdown period.

Embodiments of the third aspect of the disclosure can include any one or a combination of the following features:
a runtime for the intercycle period is more than 0.5 hours, and the purge cycle runs less than 4 minutes;
the countdown period is less than 150 days;
displacing an air restriction member of the air extractor during the purge cycle by sending a signal to an actuator, wherein the displacing comprises pushing the air restriction member using a drive assembly connected to the actuator; and
the positioning of the fan comprises attaching the fan to the air extractor, and wherein the fan is removably attached to the air extractor, further comprising removing the fan from the air extractor after the countdown period has elapsed and attaching the fan to another air extractor on another vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1A:
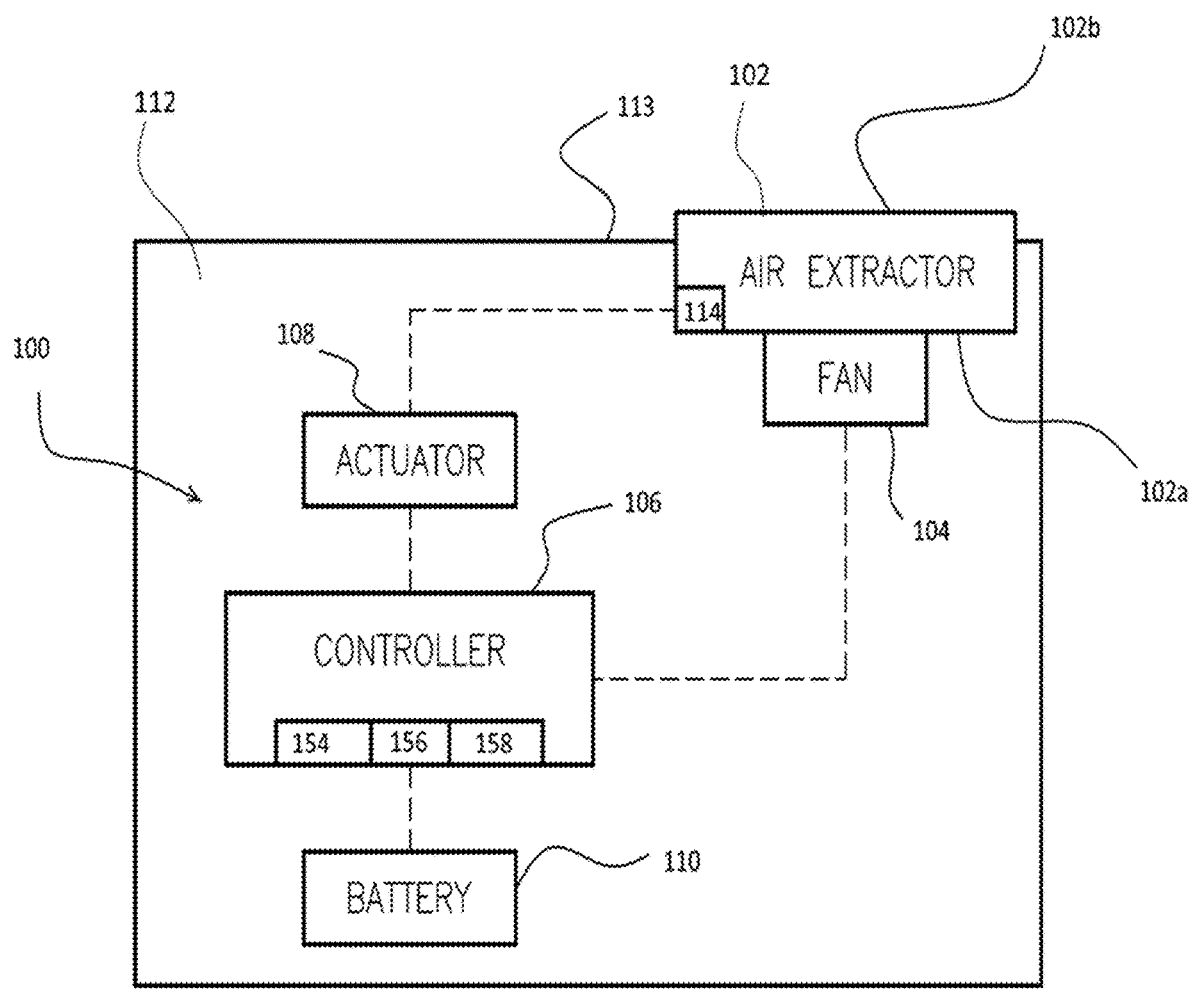
FIG. 1A is a block diagram of a system for ventilating an interior space of a vehicle to purge volatile organic compounds, according to one embodiment of the present disclosure.
Figure 1B:
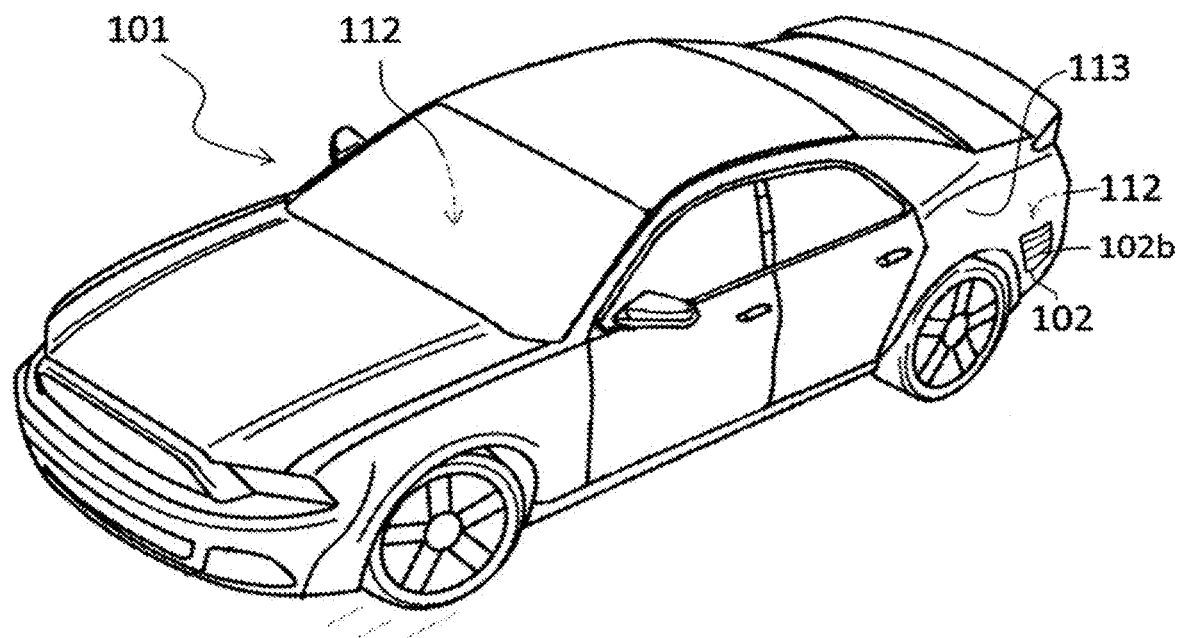
FIG. 1B is a front perspective view of a vehicle employing the system for ventilating the interior space, according to one embodiments.
Figure 1C:
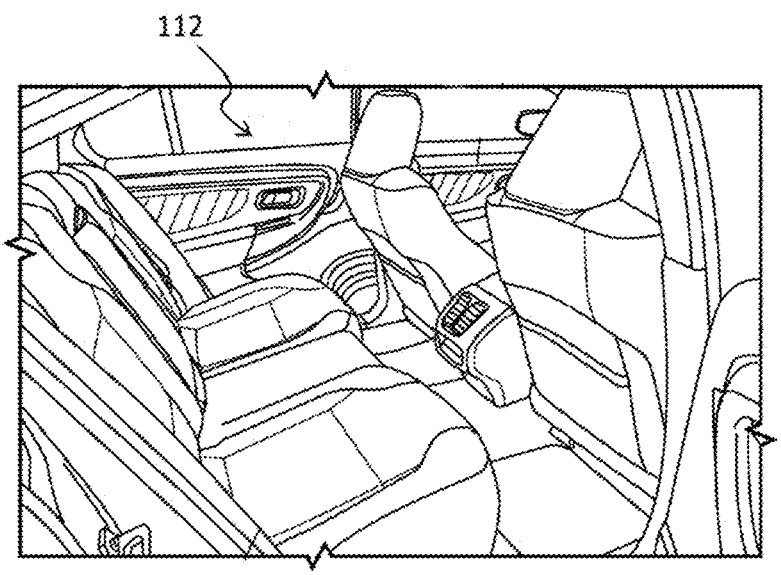
FIG. 1C is a partial side perspective view of an interior space of the vehicle of FIG. 1B, and in particular, a passenger cabin portion of the interior space.

For purposes of description herein, the terms "upper," "lower," "right," "left," "rear," "front," "vertical," "horizontal," and derivatives thereof shall relate to the concepts as oriented in FIGS. 1A-1C. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having automatic ventilation system and method for purging an interior space of a vehicle during shipping. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIG. 1A illustrates a ventilation system 100 for ventilating an interior space 112, including a passenger cabin, of a vehicle 101 which is shown, according to one example in FIGS. 1B and 1C. The system 100 is employed in the vehicle 101 and the passenger cabin of the interior space 112, to purge volatile organic compounds, according to one embodiment. The ventilation system 100 includes an air extractor 102, a fan 104, a controller 106, an actuator 108, and a battery 110. The air extractor 102 is connected to a wall 113 of the vehicle 101, with an interior side 102a of the air extractor 102 positioned within the interior space 112 of the vehicle 101, and with an exterior, or outer, side 102b, exposed to the atmosphere. FIG. 1B shows an example location of the air extractor 102 relative to the vehicle wall 113, but the location illustrated is not intended to be limiting, and in other embodiments, including for other vehicles, the air extractor 102 may be located at other positions on the vehicle wall 113, provided that the air extractor 102 is in fluid communication with the interior space 112 of the vehicle 101.

The controller 106 is communicatively linked to the actuator 108 and the fan 104 for carrying out the methods described herein for purging VOC emissions. The actuator 108 is coupled to a drive assembly 114, which in turn, operates the air extractor 102 by displacing one or more moveable air restriction members 128, or flaps, of the air extractor 102, between a closed position and an open position (as described further below with reference to FIGS. 2, 3A and 3B). A battery 110 is provided which may be separate from the vehicle battery or may be shared with the vehicle battery. The battery 110 provides an electric power source for the controller 106, the actuator 108, and the fan 104 for carrying out various operations as described herein.

The controller 106, as described herein, may include analog and/or digital circuitry and software stored in memory, and could be part of an overall vehicle control module, such as a vehicle system controller (VSC). Alternatively, the controller 106 could be a dedicated or stand-alone controller separate from the VSC. Although the controller 106 is shown as a single device, the controller 106 may include a plurality of controllers, including a plurality of software controllers within a plurality of hardware devices. Further, the controller 106 may be programmed with executable instructions for interfacing with and operating different parts of the vehicle 101. The controller 106 may include a processing unit such as a microprocessor and non-transitory memory for executing control strategies and modes of the vehicle 101, including the shipping mode as described below.

In some embodiments of the present disclosure, the controller 106 is configured to execute various operations in a shipping mode. As used herein, the term "shipping mode" may refer to an operating mode of the controller 106, during which the vehicle 101 is in transit between a point of manufacture of the vehicle 101 and a point of delivery to a predetermined location. In a given embodiment, the point of delivery may be a vehicle dealership. In yet another embodiment, the point of delivery may be a retail vehicle showroom. During the shipping mode, airflow out of the newly manufactured vehicle may be restricted such that the mitted VOCs may not readily escape.

Figure 2:
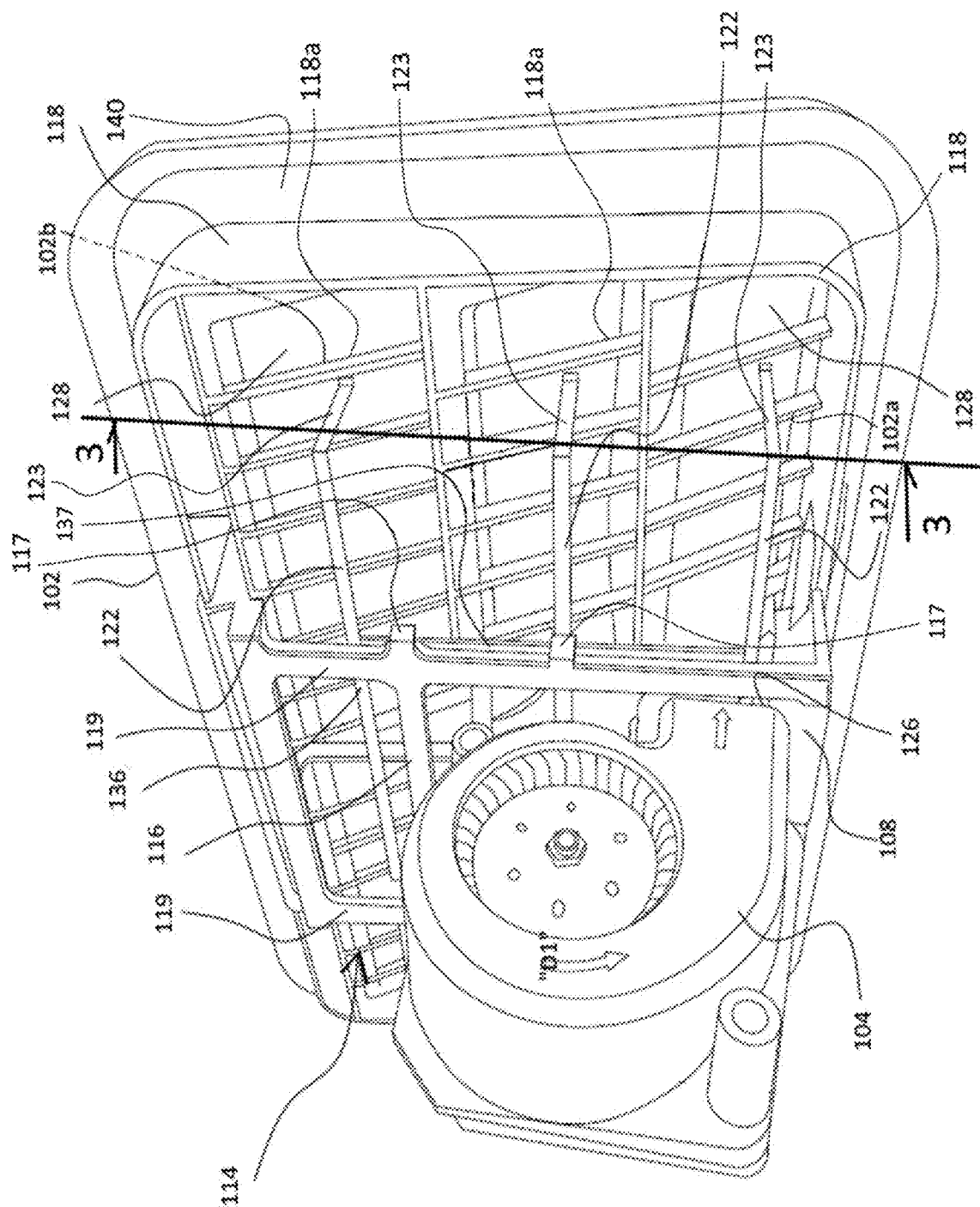
FIG. 2 is a rear perspective view of the air extractor shown in FIG. 1A.

FIG. 2 is a perspective back view of the fan 104, the actuator 108, the drive assembly 114, and the air extractor 102, for one embodiment of the ventilation system 100 shown in FIG. 1A. The air extractor 102 includes a frame 140 which provides a support structure for a grille 118, which forms, in part, both the interior side 102a and the exterior side 102b of the air extractor 102. The fan 104 may be removably attached, directly or indirectly, to the interior side 102a of the air extractor 102 by one or more releasable retaining members 103 which are represented in simplified block diagram form in FIGS. 3A and 3B.

In some embodiments, an impeller of the fan 104 is configured to rotate in a direction D1 to deliver the ventilation flow from an exhaust end portion 126 of the fan 104. The exhaust end portion 126 of the fan 104 is facing the interior side 102a of the air extractor 102, and is positioned proximate to the air extractor 102. In this context, "proximate" may mean within a distance less than a maximum width of the fan 104 including any housing of the fan 104.

Figure 3A:
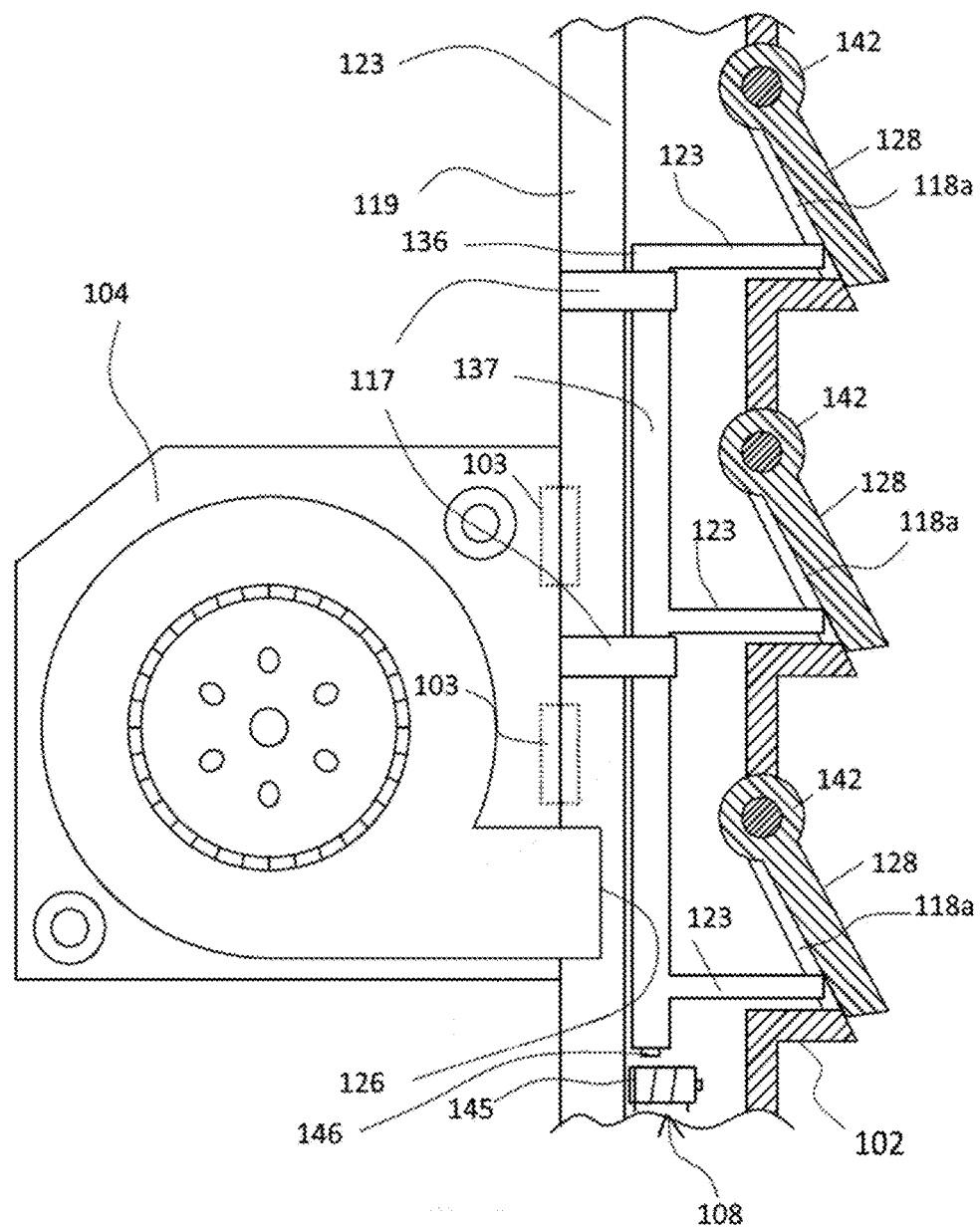
FIG. 3A is a partial cross-sectional view taken along line 3-3 of FIG. 2 showing air restriction members in the closed position.
Figure 3B:
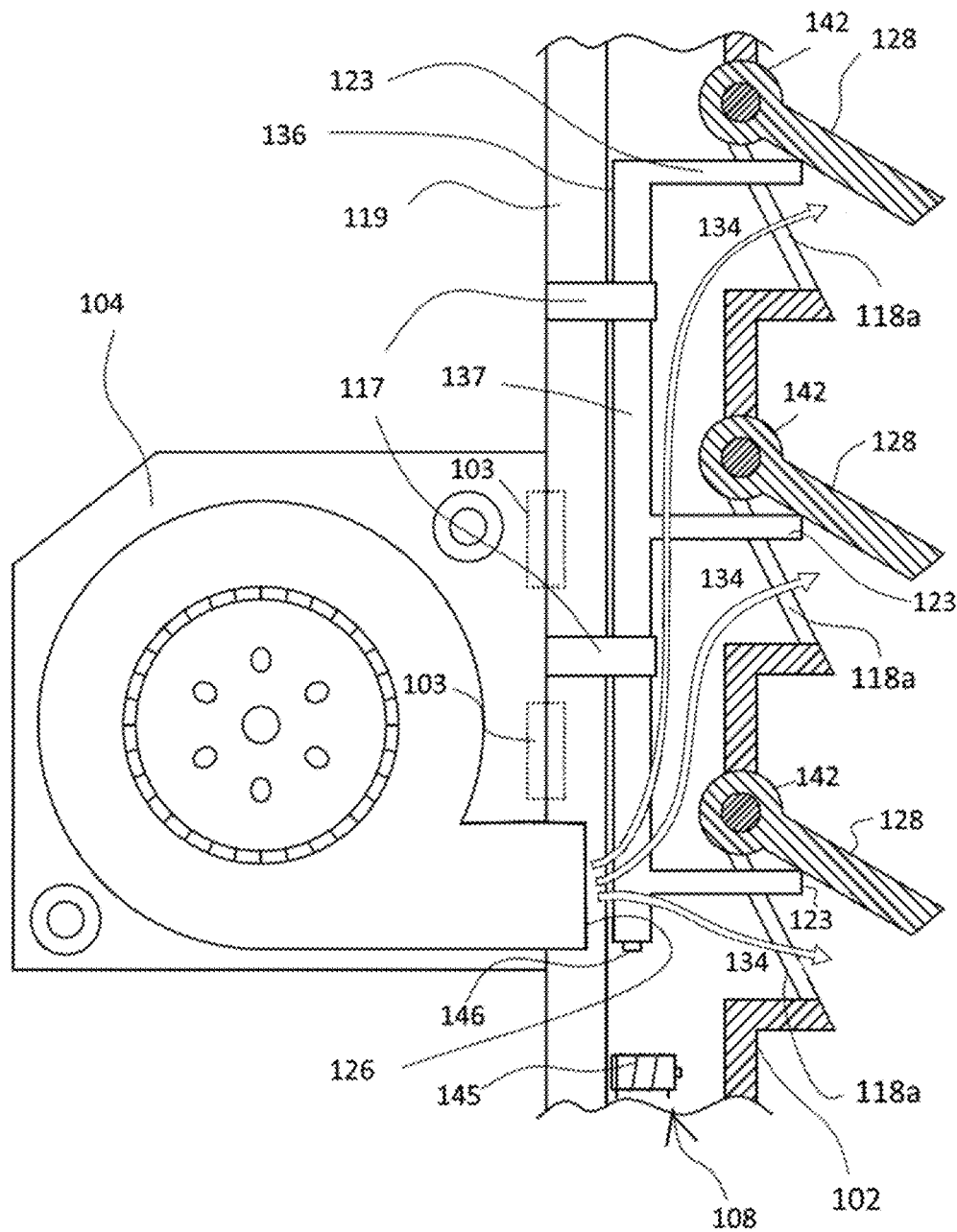
FIG. 3B is a partial cross-sectional view taken along line 3-3 of FIG. 2 showing the air restriction members in the open position.
Figure 3C:
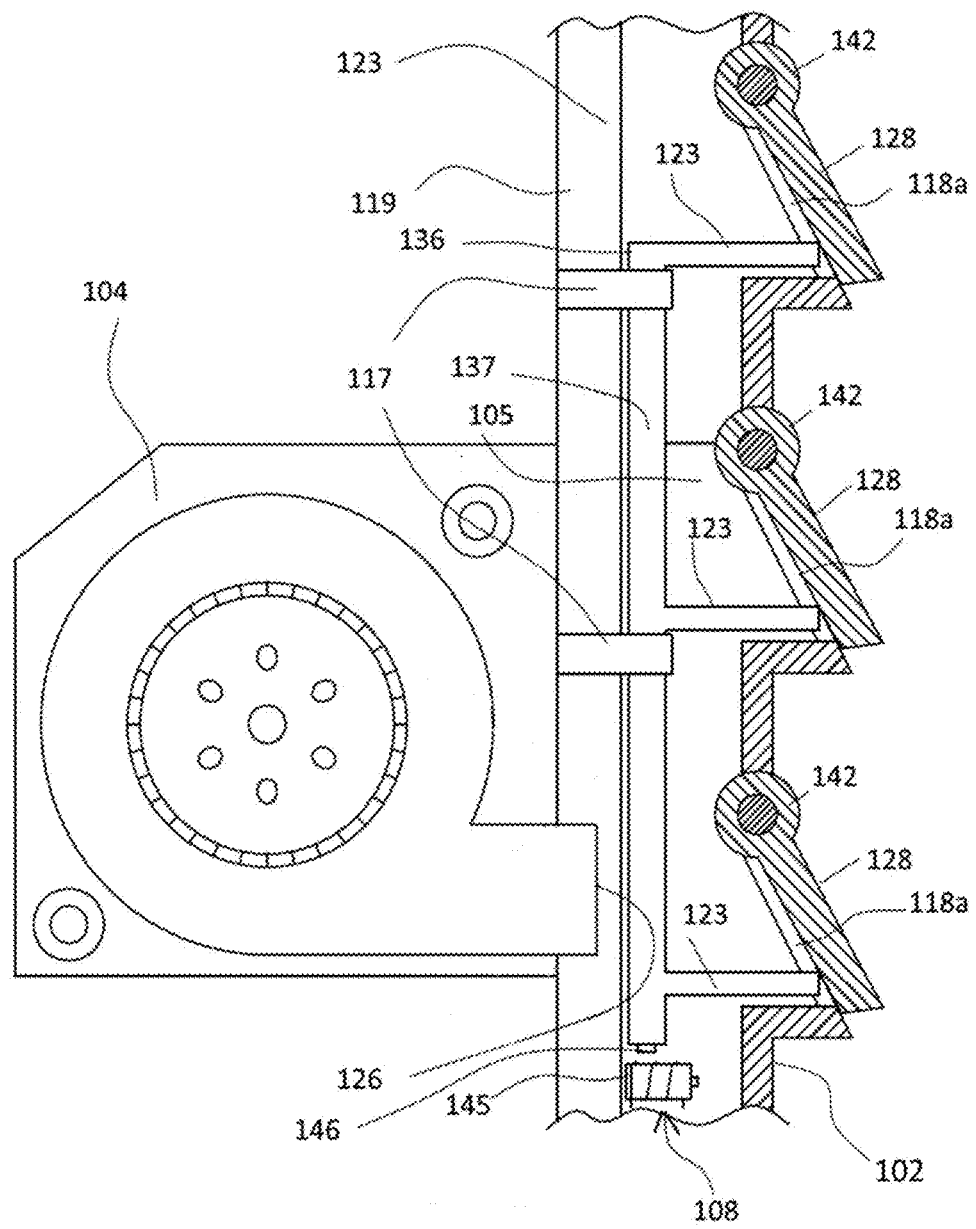
FIG. 3C is a partial cross-sectional view of a fan, air extractor and drive assembly, according to an alternative embodiment.

Referring to FIGS. 3A and 3B, in one embodiment, the releasable retaining members 103 for use in removably attaching the fan 104 to the air extractor 102, may include, for example, without limitation, hooks, clips, screws, pins, fasteners, or any of a myriad of other releasable coupling structures with corresponding receiving portions. Such releasable retaining members 103 may permit the fan 104 to be selectively attached to the air extractor 102 when the vehicle 101 is prepared for delivery, and selectively removed from the air extractor 102 when the vehicle 101 is delivered to the point of delivery. At this point, the controller 106 is no longer operating in a shipping mode. In other embodiments, the fan 104 may be attached to components of a vehicle 101 other than the air extractor 102, by similar means as described above. Providing a convenient manner in which to attach the fan 104 to, and remove the fan 104 from, the air extractor 102, or a location adjacent or proximate the air extractor 102, enables reusability of the fan 104 for other vehicles. In further alternate embodiments, the air extractor 102 and the fan 104, or a housing for the fan 104, may be manufactured as integral components with each other. FIG. 3C, shows an integral connecting section 105, between the fan 104 and the air extractor 102, showing one of many potential manners in which the fan 104 can be integrally made with the air extractor 102, so that the fan 104 is either permanently mounted to the air extractor 102, or a housing of the fan 104 is permanently mounted to the air extractor 102, while other components of the fan 104 may be selectively removed, such as, for example, the fan motor or other components.

In the example embodiment shown in FIGS. 2, 3A and 3B, the drive assembly 114 can be mounted on the air extractor 102, and may be fastened to the grille structure 118, or the frame 140, or both. The drive assembly 114 includes a guide 116 having a plurality of tabs 117 located in a spaced-apart manner along a pair of vertically extending elongated guide frames 119. The drive assembly 114 also includes a slider 136, which comprises a pair of main sections 137. Each main section 137 can be a vertically extending elongated runner, vertically aligned with, and slidable upward and downward, against one of the guide frames 119, within a range of vertical motion. Lateral movement of the slider 136 and the pair of main sections 137 can be constrained, due to the main sections 137 being guided by the tabs 117. That is, the tabs 117 can be provided in side-by-side pairs, with the main sections 137 disposed between the pairs of tabs 117, and movable upward and downward between the pairs of tabs 117.

A plurality of vertically spaced apart slider arms 122 can each separately extend laterally from the main sections 137, and can include outwardly (toward the exterior side of the air extractor 102) extending contact sections 123, that extend outward to, and contact an interior side of, the air restriction members 128 of the air extractor 102. In an alternate embodiment, there is only one slider arm 122, or more than the three slider arms 122 shown in FIG. 2. The contact sections 123 of the slider arms 122 are in contact with the moveable air restriction members 128, or make contact with the moveable air restrictions members 128 when displaced.

In the illustrated embodiment of FIGS. 2, 3A and 3B, a plurality of vertical cross members 118a of the grille 118, each have a slanted outer surface, slanting downwardly outward. As best seen in FIG. 3A, the air restriction members 128 can rest, in part, against the vertical cross members 118a, when in a closed position. In the closed position, or resting position, the air restriction members 128 (which can each have the structure of a flap with laterally extending width and which hang downwardly from the hinge portions 142, shown in FIGS. 3A and 3B), are therefore also slanted downwardly outward, as best seen in FIGS. 2 and 3A.

The air restrictions members 128 can pivot about a top hinge portion 142, from the closed position as shown in FIG. 3A, to an open position as shown in FIG. 3B. During such pivot motion, a lower portion of the air restriction members 128 is displaced outwardly and upwardly, from the closed position, to the open position, which in turn, reduces fluid flow restriction across the air extractor 102, relative to the closed position.

Still referring to FIGS. 3A and 3B, in one embodiment, the actuator 108 comprises one or more electromagnets 145 positioned below at least one of the sections 137 of the slider 136, for actuating the drive assembly 114. The electromagnets 145 can be activated to generate a magnetic field to selectively attract or repel respective targets 146, wherein the respective targets 146 are made of magnetic metal such as steel mounted to a bottom portion of the main sections 137. For example, when the air restriction members 128 are in the closed position of FIG. 3A, and the actuator is initiated to open the air restriction members 128, the electromagnets 145 are activated to repel the targets 146. In response, the main sections 137 are pushed slidably upward, with the contact sections 123 of the slider arms 122 also being forced upward against, and displacing, the air restriction members 128, from the closed position of FIG. 3A, to the open position of FIG. 3B. By contrast, and for example, when the electromagnets 145 are activated to attract the targets 146, the main sections 137 are pulled slidably downward, which in turn, withdraws the contact sections 123 downward, and the air restriction members 128 are thereby retracted, or otherwise allowed to drop, from the open position of FIG. 3B, to the closed position of FIG. 3A. In another embodiment, after the electromagnets 145 are activated to repel the targets 146, and displace the air restriction members 128 to the open position such as shown in FIG. 3B, the air restriction members 128 can be displaced back to the closed position by deactivating the electromagnets 145 and merely allowing the main sections 137 to drop upon such deactivation. This allows the air restriction members 128 to drop to the closed position of FIG. 3A.

The air extractor 102 may be configured as an electromagnetic activated air extractor as disclosed in U.S. Patent Publication No. 2020/0263801, entitled "VALVE ASSEMBLY CONTROLLED BY ELECTROMAGNET," according to one example. The aforementioned U.S. patent is hereby incorporated herein by reference.

When the fan 104 delivers the ventilation flow by being activated by the controller 106, it can purge VOC emissions in the vehicle interior space 112, through a fluid path 134 as shown in FIG. 3B which can include, without limitation, multiple paths through the air extractor 102, extending from the exhaust end portion 126 of the fan 104, to the outside atmosphere, through spaces between the cross members 118a of the grilles 118 of the air extractor 102. As discussed previously herein, in some embodiments, the exhaust end portion 126 of the fan 104 is positioned proximate, or adjacent, to one or more of the moveable air restriction members 128. In some embodiments, the fan 104 is a low power fan that is configured and selected to supply ventilation flow at a rate of less than 300 cubic feet per minute (CFM), less than 150 CFM, or less than 50 CFM, during each of a plurality of purge cycles, as described below. The fan 104 may also be a regular commercially available centrifugal or other ventilation fan including a fan motor. In some embodiments, the fan is a 0.65 A (Amp) fan, and can provide up to 30-40 CFM of airflow in use in ventilation system 100, or in another specific example, the fan 104 is a 1 A or 0.28 A fan. In other embodiments, the fan 104 may be spaced apart from, or not otherwise adjacent, or proximate to, the air extractor 102. In such other embodiments, the fan 104 may still be a low power fan, or may be selected to have a higher power rating than would otherwise be required if the fan 104 is proximate to, adjacent, or attached to the air extractor 102.

Referring back to FIG. 1A, in some embodiments, the controller 106 is configured to initiate a plurality of purge cycles, spaced apart in time by intercycle periods, during a shipping mode of the controller 106. The shipping mode can be set to occur over a preselected shipping countdown time period (e.g., 90 days, 120 days, 150 days, less than 150 days, etc.), which countdown time period may be tracked by a shipping mode timer 158. In some embodiments, each purge cycle begins with power being transmitted to activate and thereby operate the fan 104, and each purge cycle runs for a pre-set cycle period of time, or purge cycle runtime, during which the fan 104 continues to operate, and the purge cycle runtime may be counted down by a purge cycle timer 154 of the controller 106. Operation of the fan 104 ventilates the interior space 112 during the purge cycle to purge VOC emissions from the interior space 112 of the vehicle 101 to the atmosphere outside the vehicle 101. Each purge cycle ends when the corresponding purge cycle runtime elapses, immediately after which, power to the fan is discontinued to thereby deactivate the fan. In some embodiments, the purge cycle runs for 2 minutes, in a range of 1-4 minutes, less than 4 minutes, or more than 4 minutes. In some embodiments, the purge cycle runtimes are consistent throughout all purge cycles for a shipping mode, while in other embodiments, the purge cycle runtimes can vary between purge cycles, and may vary on a pre-set pattern, or may vary depending on a function or variable input.

The intercycle periods run between purge cycles, and at the beginning of each intercycle period, power to the fan 104 is terminated, and the fan 104 is inactive throughout the remainder of the intercycle period until the controller 106 initiates a next purge cycle (which coincides with the time power is transmitted to the fan 104). The intercycle periods may last for a preselected runtime, and may all have the same runtime throughout a shipping time countdown period. In other embodiments, runtime of the intercycle periods may vary between intercycle periods, even during the same shipping time countdown period. In some embodiments, a runtime of each intercycle period may be tracked, or counted down, by an intercycle period timer 156 of the controller 106, which counts down the intercycle period runtime before the controller 106 initiates the purge cycle, and each intercycle period runtime may last for 1 hour, more than 0.5 hours, in a range of 0.5-2 hours, less than 2 hours, or more than 2 hours.

In some embodiments, a shipping mode timer 158 ensures that the system 100 is deactivated when the preselected shipping time countdown period is reached. However, the shipping mode can be terminated earlier if the vehicle 101 is sold, or in some cases, if the vehicle 101 is delivered to the point of delivery. Otherwise, the system 100 can remain active as long as the shipping mode timer 158 is active, namely, that a shipping time countdown period has not elapsed. In an example, the controller 106 deactivates the system 100 by permanently terminating the power supply to the fan 104, once a preselected shipping time countdown period is reached (e.g., 90 days, 120 days, 150 days, or a preselected number of days less than 150 days, etc.). In another example, the controller 106 includes an actuator (e.g., graphical or other button) that can be utilized to deactivate the shipping mode, and shipping mode timer 158, which deactivates the system 100. Note that, deactivating the system 100 as described above based on termination of the shipping mode, is not intended to deactivate any functions for components of the system 100 that are independent of the automatic ventilation system 100 for purging an interior space 112 of vehicle 101 during shipping for the present disclosure.

It is also noted that, in some embodiments, each purge cycle includes displacing one or more air restriction members 128 to the open position on the air extractor 102 by sending a signal to the actuator 108, so as to activate the electromagnets 145, and operate the drive assembly 114 as described above in relation to FIGS. 3A and 3B. This can lower backpressure on ventilation through the air extractor 102 during a purge cycle, and thus increase the rate of purge of VOC emissions during the purge cycle. In such embodiments, the intercycle period can also include sending a signal to the actuator 108 from the controller 106 to close the air restriction members 128, either by discontinuing power supplied to the electromagnets 145, so that the air restriction members 128 drop, or activating the electromagnets 145 to attract the targets 146, as described above in relation to FIGS. 3A and 3B.

Figure 4A:
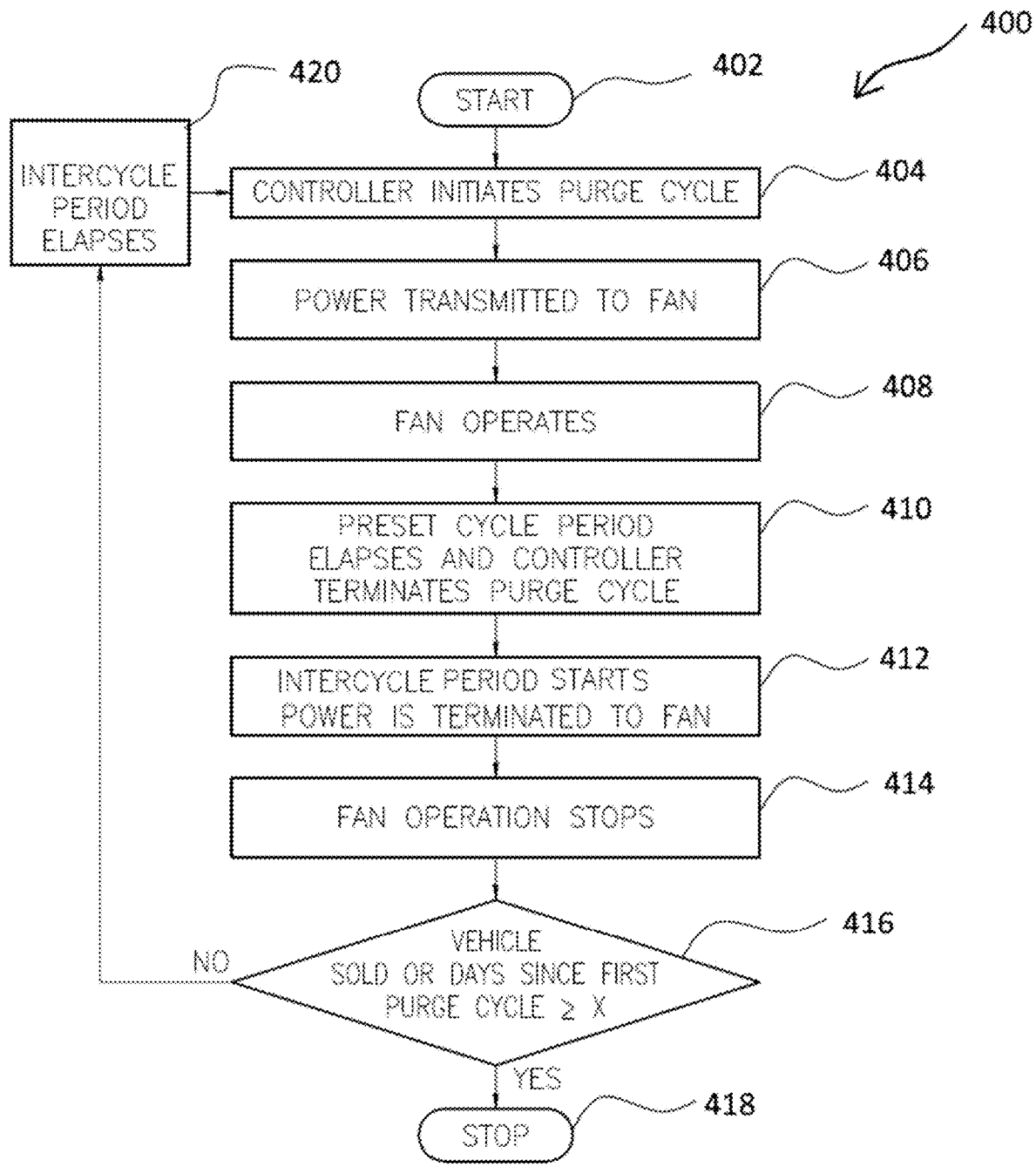
FIG. 4A is a flow chart illustrating a method of ventilating a vehicle during shipping, according to one embodiment of the present disclosure.
Figure 4B:
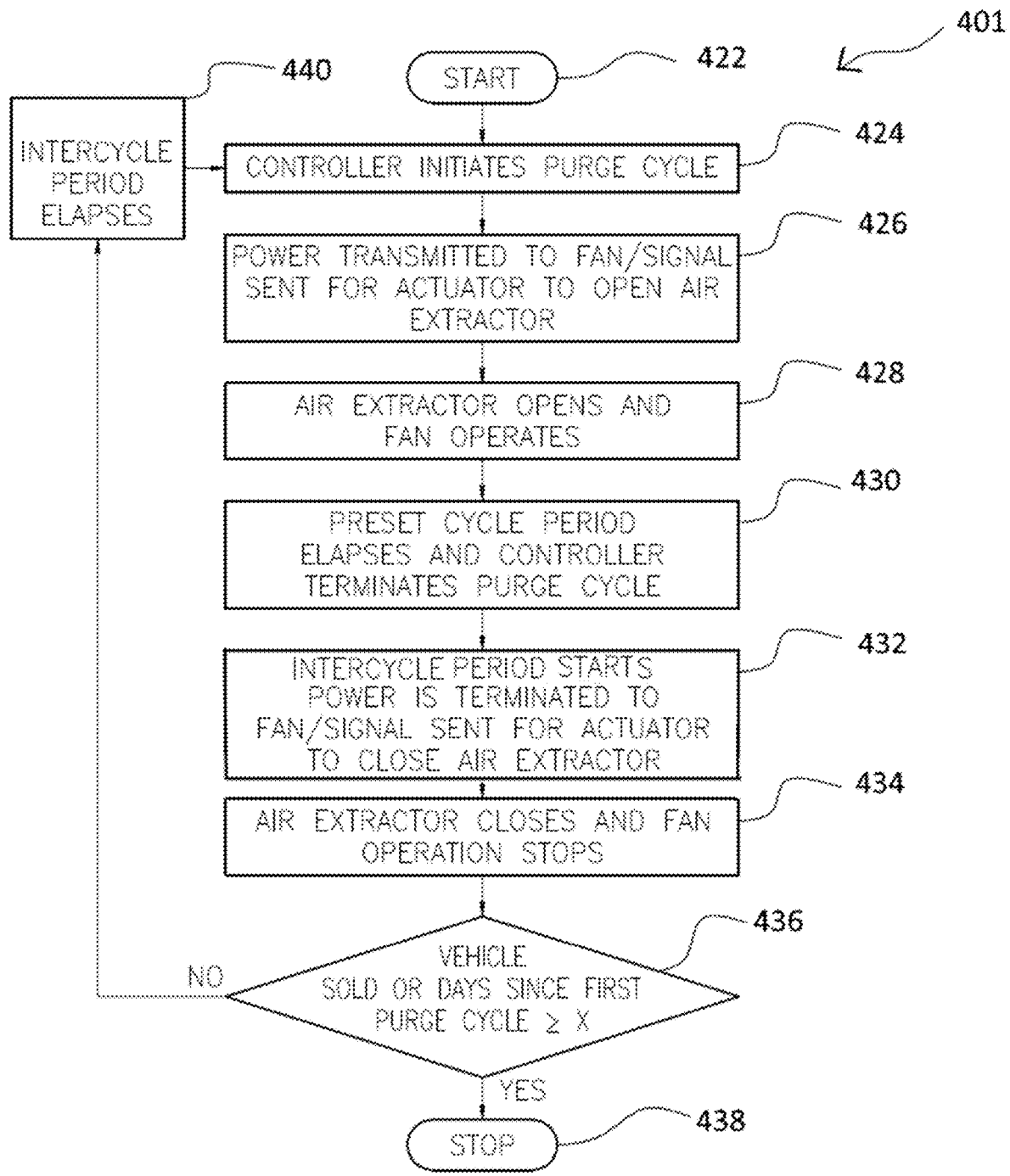
FIG. 4B is a flow chart illustrating an alternative method for ventilating a vehicle during shipping, according to another embodiment.

FIGS. 4A and 4B show flowcharts illustrating alternate embodiments of methods of purging air from the interior space of the vehicle.

In operating method 400 of FIG. 4A, the ventilation flow of the fan 104 is sufficient to purge VOC emissions from the interior space 112 through the air extractor 102, without use of the actuator 108 or drive assembly 114. Even if the fan is a low power fan, the proximity, or closeness, of the fan 104 to the air extractor 102 can be selected to be sufficient such that the ventilation flow causes the air restriction members 128 to displace and relieve back pressure against the ventilation flow, to achieve adequate purging of VOCs.

Operating method 400 begins at step 402 and proceeds to step 404 which, during a shipping mode, the controller 106 initiates the purge cycle, which can be initiated immediately after the controller 106 is in the shipping mode, or within a preselected period of time after the controller is first set in the shipping mode. At step 406, the controller 106 facilitates transmission of power from the battery 110 to the fan 104. At step 408, the fan 104 operates and delivers the ventilation flow to the atmosphere through a fluid path 134, to purge VOC emissions from the interior space 112 of the vehicle 101. At step 410, the controller 106 terminates the purge cycle after the pre-set cycle period, or purge cycle runtime, elapses as the purge cycle period timer 154 stops. At step 412, intercycle period starts, which corresponds to the time that the controller 106 terminates transmission of power to the fan 104 to thereby deactivate the fan 104, and initiates the intercycle period timer 156. At step 414, the operation of the fan 104 stops. At step 416, the controller 106 determines whether either of the following two conditions are achieved:

a first condition being whether the vehicle 101 has been sold or the shipping mode has been otherwise manually terminated, or a second condition being whether a preselected shipping time countdown period has elapsed since the shipping mode was initiated.

In some embodiments, the step 416 could be continual, in that the controller 106 is continually determining or monitoring whether either of the two conditions above are achieved.

If either condition above is true, the operating method 400 is terminated. If both of the two conditions are false, the controller 106, at 404, will initiate the next purge cycle after the intercycle period runtime elapses at step 420, as the intercycle period timer 156 expires. The operating method 400 including initiating the purge cycle at 404, terminating the purge cycle at 410, and executing the intercycle period starting at 412 is repeated over a plurality of times until the preselected shipping mode countdown period is reached or until the vehicle 101 is sold, or the shipping mode is otherwise interrupted.

FIG. 4B illustrated an operating method 401, illustrating a method of operating the system 100, also shown in FIGS. 1A, 2, 3A and 3B, including use of the actuator 108, which in turn operates the drive assembly 114. Again, method 401 begins at step 422 and proceeds to step 424 to initiate the first purge cycle immediately upon the controller 106 being operated in a shipping mode, or at some time thereafter, which may be a pre-set time.

In operating method 401, at step 424, the controller 106 initiates the purge cycle. At step 426, the controller 106 facilitates transmission of power from the battery 110 to the fan 104 and to the actuator 108 during the purge cycle. When the actuator 108 receives power from the battery 110, the electromagnet 145 repels the targets 146 resulting in the air extractor 102 opening, or in other words, the air restriction members 128 of the air extractor opening at step 428. At step 430, the controller 106 terminates the purge cycle. At step 432, the intercycle period starts, and the controller 106 simultaneously terminates transmission of power to the fan 104 and a signal is sent to the actuator 108 to close the air extractor 102, which can compromise deactivating the electromagnets 145 to allow the air restriction members 128 to drop, or activating the electromagnets to attract the targets 146 (as previously described). At step 434, the moveable air restriction members 128 are displaced to the closed or resting position shown in FIG. 3B, and the operation of the fan 104 stops. At step 436, the controller 106 determines whether either of the following two conditions are achieved:

a first condition being whether the vehicle 101 has been sold or the shipping mode has been otherwise manually terminated, or a second condition being whether a preselected shipping time countdown period has been reached since the shipping mode was initiated.

In some embodiments, the step 436 could be continual, in that the controller 106 is continually determining or monitoring whether either of the two conditions above are achieved.

If either condition a) or b) above is true, the method 401 is terminated. If both of the two conditions are false, the controller 106, at 424, initiates the next purge cycle after the intercycle period runtime elapses as the intercycle period timer 156 expires at step 440. The operating method 401, including initiating the purge cycle at 424, terminating the purge cycle at 430, and initiating the intercycle period at 432 is repeated over the plurality of times.

The ventilation air flow provided by various embodiments of the present disclosure will purge VOCs that may be emitted by components of the vehicle 101 and present in the interior of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A ventilation system for purging an interior space of a vehicle, the ventilation system comprising:
    an air extractor having an interior side within the interior space of the vehicle and an exterior side, opposite the interior side, exposed to an outside atmosphere, the air extractor including:
        a fluid path extending between the interior space and the atmosphere; and
        a movable air restriction member within the fluid path;
    a fan adjacent to the air extractor on the interior side, with an exhaust end portion of the fan being positioned proximate the movable air restriction member to direct a ventilation flow through the fluid path to the atmosphere; and
    a controller configured to operate in a shipping mode, wherein the controller initiates a plurality of purge cycles over a period of time, with each purge cycle being spaced apart from the next purge cycle by an intercycle period, wherein the fan operates during each of the plurality of purge cycles to deliver the ventilation flow and the fan is inactive during each intercycle period, and wherein the controller is configured to continue initiating the plurality of purge cycles over a preselected shipping time countdown period unless otherwise interrupted.

2. The ventilation system of claim 1, wherein the fan is integrally formed with at least a portion of the air extractor.

3. The ventilation system of claim 1, wherein the fan is removably attached to the air extractor by a releasable retaining member.

4. The ventilation system of claim 1, wherein each of the plurality of purge cycles runs between 1-4 minutes.

5. The ventilation system of claim 1, wherein each of the plurality of purge cycles runs for less than 4 minutes.

6. The ventilation system of claim 1, wherein the intercycle period lasts for between 0.5-2 hours.

7. The ventilation system of claim 1, wherein the intercycle period lasts for more than 0.5 hours.

8. The ventilation system of claim 1, wherein the fan supplies less than 300 CFM of ventilation flow during each of the plurality of purge cycles.

9. The ventilation system of claim 1, wherein the fan supplies less than 50 CFM of ventilation flow during each of the plurality of purge cycles.

10. The ventilation system of claim 1 further comprising an actuator coupled to a drive assembly for the air extractor, wherein the controller activates the actuator to actuate the drive assembly and displace the movable air restriction member from a closed position to an open position during one or more of the purge cycles.

11. A ventilation system for purging an interior space of a vehicle, the ventilation system comprising:
    an air extractor connected to a vehicle wall and having an interior side within the interior space defined by the vehicle wall;
    a fan attached to the interior side; and
    a controller configured to operate in a shipping mode to activate the fan to generate ventilation flow through the air extractor, wherein the controller is configured to operate the fan during a plurality of purge cycles, with the plurality of purge cycles being spaced apart by intercycle periods, and wherein the controller is configured to continue initiating the plurality of purge cycles over a preselected shipping time countdown period unless otherwise interrupted.

12. The ventilation system of claim 11, wherein the preselected shipping time countdown period is less than 150 days.

13. The ventilation system of claim 11 further comprising a drive assembly that displaces a moveable air restriction member of the air extractor if operated, and wherein the controller is configured to operate the drive assembly to displace the moveable air restriction member from a closed position to an open position during at least part of the time if the ventilation flow is generated.

14. A method of purging an interior space of a vehicle, the method comprising:
    positioning a fan proximate an air extractor, the air extractor having a fluid path extending between the interior space of the vehicle and an outside atmosphere; and
    controlling an operating process for the fan using a controller in a shipping mode, the operating process including:
        initiating a purge cycle during which power is transmitted to the fan for operating the fan;
        executing an intercycle period during which power is terminated to the fan; and
        repeating the initiating and executing a plurality of times during a countdown period.

15. The method of claim 14, wherein a runtime for the intercycle period is more than 0.5 hours, and the purge cycle runs less than 4 minutes.

16. The method of claim 14, wherein the countdown period is less than 150 days.

17. The method of claim 14 further comprising displacing an air restriction member of the air extractor during the purge cycle by sending a signal to an actuator, wherein the displacing comprises pushing the air restriction member using a drive assembly connected to the actuator.

18. The method of claim 14, wherein the positioning of the fan comprises attaching the fan to the air extractor, and wherein the fan is removably attached to the air extractor, further comprising removing the fan from the air extractor after the countdown period has elapsed and attaching the fan to another air extractor on another vehicle.

\* \* \* \* \*